US010540180B2

(12) United States Patent
Baker et al.

(10) Patent No.: US 10,540,180 B2
(45) Date of Patent: Jan. 21, 2020

(54) RECONFIGURABLE PROCESSORS AND METHODS FOR COLLECTING COMPUTER PROGRAM INSTRUCTION EXECUTION STATISTICS

(71) Applicant: Lenovo Enterprise Solutions (Singapore) Pte. Ltd., New Tech Park (SG)

(72) Inventors: Brian A. Baker, Raleigh, NC (US); William M. Megarity, Raleigh, NC (US); Luke D. Remis, Raleigh, NC (US); Christopher L. Wood, Greenville, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 284 days.

(21) Appl. No.: 14/562,742

(22) Filed: Dec. 7, 2014

(65) Prior Publication Data

US 2016/0162294 A1 Jun. 9, 2016

(51) Int. Cl.
*G06F 9/30* (2018.01)

(52) U.S. Cl.
CPC .............................. *G06F 9/30181* (2013.01)

(58) Field of Classification Search
CPC .................... G06F 9/30181; G06F 11/3466
See application file for complete search history.

(56) References Cited

U.S. PATENT DOCUMENTS

| 4,910,663 | A | * | 3/1990 | Bailey | G06F 11/3644 |
| | | | | | 714/34 |
| 5,687,349 | A | * | 11/1997 | McGarity | G06F 9/3806 |
| | | | | | 711/123 |
| 6,311,149 | B1 | * | 10/2001 | Ryan | G06F 11/2294 |
| | | | | | 703/21 |
| 2001/0007124 | A1 | * | 7/2001 | Iwamura | G06F 8/66 |
| | | | | | 711/165 |

(Continued)

OTHER PUBLICATIONS

Srikant, Y. N., and P. Shankar. The Compiler Design Handbook: Optimizations and Machine Code Generation. Boca Raton, FL: CRC, 2003. Print.*

(Continued)

*Primary Examiner* — Eric Coleman
(74) *Attorney, Agent, or Firm* — Olive Law Group, PLLC

(57) ABSTRACT

Reconfigurable processors and methods for collecting computer program instruction execution statistics are disclosed. According to an aspect, a method includes providing a reconfigurable processor configured to execute a set of central processing unit (CPU) instructions that each have a function. The method also includes modifying the function of one or more of the CPU instructions that identifies an instruction address and a destination address pair of the CPU instruction(s) based on a defined test case. Further, the method includes using the reconfigurable processor to execute the set of CPU instructions. The method also includes identifying an instruction address and destination address pair of the CPU instruction(s) having the modified function when the CPU instruction(s) having the modified function is executed during execution of the set of CPU instructions.

20 Claims, 7 Drawing Sheets

(56) References Cited

U.S. PATENT DOCUMENTS

| | | | |
|---|---|---|---|
| 2002/0055834 A1* | 5/2002 | Andrade | G06F 11/263 703/27 |
| 2004/0093589 A1* | 5/2004 | Master | G06F 17/5022 717/136 |
| 2006/0020918 A1* | 1/2006 | Mosberger | G06F 11/3409 717/124 |
| 2006/0212680 A1* | 9/2006 | Yasue | G06F 9/30047 712/207 |
| 2006/0277439 A1 | 12/2006 | Davia et al. | |
| 2007/0043531 A1* | 2/2007 | Kosche | G06F 11/3447 702/182 |
| 2009/0089760 A1* | 4/2009 | Gill | G06F 11/3624 717/128 |
| 2009/0327673 A1* | 12/2009 | Yoshimatsu | G06F 9/3806 712/240 |
| 2010/0251214 A1 | 9/2010 | Bohling et al. | |
| 2011/0047532 A1* | 2/2011 | Wang | G06F 11/3676 717/130 |
| 2011/0066420 A1 | 3/2011 | Bassin et al. | |
| 2013/0117730 A1* | 5/2013 | Wisniewski | G06F 11/3664 717/125 |
| 2014/0019737 A1* | 1/2014 | Hilton | G06F 9/3806 712/239 |
| 2015/0186251 A1* | 7/2015 | Friedler | G06F 11/3672 717/124 |

OTHER PUBLICATIONS

Piziali, Andrew. Functional Verification Coverage Measurement and Analysis. Boston: Kluwer Academic, 2004. Print.*

M. Grosso and M. Sonza Reorda, "Exploiting Embedded FPGA in On-line Software-based Test Strategies for Microprocessor Cores", Jun. 2009, IEEE, pp. 95-100.*

IPCOM000171311D; "Dynamically Configured Hardware Accelerator Functions"; An IP.com Prior Art Database Technical Disclosure; http://ip.com/IPCOM/000171311D; Jun. 4, 2008.

IPCOM000171310D "System for Vectorized Hardware Accelerated Functions with Automatic Interface Generation"; An IP.com Prior Art Database Technical Disclosure; http://ip.com/IPCOM/000171310D; Jun. 4, 2008.

Code Coverage, Wikipedia; Obtained from http://en.wikipedia.org/wiki/Code_Coverage; Jun. 24, 2014.

Microcode; Wikipedia; Obtained from http://en.wikipedia.org/wiki/Microcode; Jun. 24. 2014.

Profiling (computer programming); Obtained from http://en.wikipedia.org/wiki/Profiling_(computer_programming); Jun. 24, 2014.

* cited by examiner

US 10,540,180 B2

RECONFIGURABLE PROCESSORS AND METHODS FOR COLLECTING COMPUTER PROGRAM INSTRUCTION EXECUTION STATISTICS

BACKGROUND

Technical Field

The present disclosure is related to computer program instruction execution statistics collection, and more specifically, to reconfigurable processors and methods for collecting computer program instruction execution statistics.

Description of Related Art

Computer software represents a set of instructions included in a computer program. The set of instructions govern the operation of a computer system and instruct the hardware operate in a particular manner. Computer software contrasts with computer hardware, wherein the computer hardware is the physical component of computers. Computer software includes all computer programs regardless of their architecture; for example, executable files, libraries and scripts are computer software. Computer software includes clearly defined instructions that, upon execution, instruct hardware to perform the tasks for which the hardware is designed. As an example, an instruction in the computer software may change the value stored in a particular storage location inside the computer—an effect that is not directly observable to the user. An instruction may also cause an indicator, graph, image, or text, as an example, to appear on a display of the computer system. This may represent a state change which a user should be aware or which may invite the user to respond (e.g., user input). Computer software may also be used to perform useful work or provide entertainment functions beyond the basic operation of the computer itself. Computer software may also be used to provide sophisticated control of machines and instrumentation in medical, power, or military applications. In this manner, it is imperative to test the computer software to eliminate as many errors or "bugs" as possible.

Computer software testing is a process designed to gather valuable information and insight into the state of the system during execution. Typical methods rely on repeated operations in an application to characterize the stability of the software using external observations such as waiting for a sound or a light to turn on or an indicator to appear on the display, as an example. This may require repeated operations in an application and may often leave many code branches unexecuted and unverified. Other methods may rely on modifying the computer software to capture the code path and code coverage. The code coverage is an indication of the percentage of the computer software which has actually been tested during execution. However, when the computer software is modified, the computer software often runs slower and doesn't represent ship-level code (e.g., the computer software actually shipped to the customer). Yet another method for testing computer software, may require hardware test ports that give code coverage without modifying source code. This method of computer software testing requires hardware test ports and have a large cost overhead since those methods require external hardware and memory. Thus, there is a need for devices and techniques that provide an on-chip hardware solution to measure and analyze code coverage providing real-time and other computer software execution statistics without modification of the computer software being tested and without requiring specialized external hardware and memory.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are reconfigurable processors and methods for collecting computer program instruction execution statistics. According to an aspect, a method includes providing a reconfigurable processor configured to execute a set of central processing unit (CPU) instructions that each have a function. The method also includes modifying the function of one or more of the CPU instructions that identifies an instruction address and a destination address pair of the CPU instruction(s) based on a defined test case. Further, the method includes using the reconfigurable processor to execute the set of CPU instructions. The method also includes identifying an instruction address and destination address pair of the CPU instruction(s) having the modified function when the CPU instruction(s) having the modified function is executed during execution of the set of CPU instructions.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

As referred to herein, the term "computing device" should be broadly construed. It can include any type of device including hardware, software, firmware, the like, and combinations thereof. A computing device may include one or more processors and memory or other suitable non-transitory, computer readable storage medium having computer readable program code for implementing methods in accordance with embodiments of the present disclosure. In another example, a computing device may be a server or other computer and communicatively connected to other computing devices (e.g., handheld devices or computers) for data analysis. In another example, a computing device may be a mobile computing device such as, for example, but not limited to, a smart phone, a cell phone, a pager, a personal digital assistant (PDA), a mobile computer with a smart phone client, or the like. A computing device can also include any type of conventional computer, for example, a laptop computer or a tablet computer.

Figure 1:
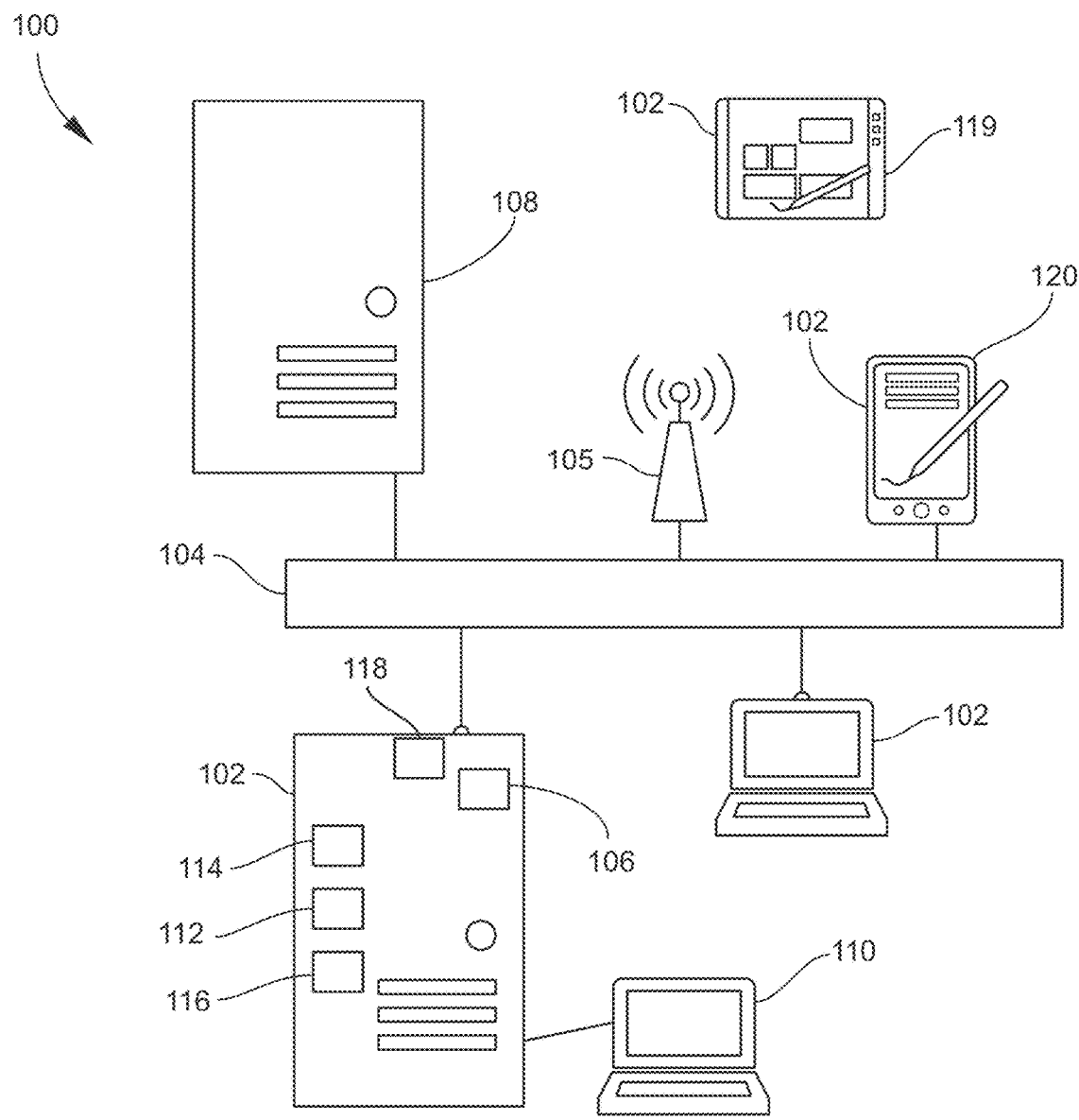
FIG. 1 illustrates a block diagram of an example system for the collection of computer program instruction execution statistics using reconfigurable processors according to embodiments of the present disclosure.

FIG. 1 illustrates a block diagram of an example system 100 for the collection of computer program instruction execution statistics using reconfigurable processors according to embodiments of the present disclosure. The system 100 may comprise a computing device 102 which may be used to execute computer program instructions or computer software according to embodiments of the present disclosure. The computing device 102 may be communicatively connected to a communications network 104, which may be any suitable wide area network (WAN), local area network (LAN), either wireless 105 (e.g., WIFI™, BLUETOOTH® communication technology) and/or wired. The computing device 102, and other components, not shown, may be configured to collect execution statistics using a reconfigurable processor 106. A reconfigurable processor 106 may be a microprocessor with erasable hardware units comprised of lower level hardware logic components, such as, logical "and" or logical "or" gates that can be reconfigured or rewired dynamically. This allows the reconfigurable processor 106 to adapt effectively to the programming tasks demanded by a particular set of central processing unit (CPU) instructions or software the reconfigurable processor 106 may be executing at any given time. As an example, the reconfigurable processor 106 may be able to transform itself from a video chip to a central processing unit (CPU) to a graphics chip, all optimized to allow applications to run at the highest possible speed. The reconfigurable processor 106 may also be referred to as a soft core processor implemented, for example, via Very High Speed Integrated Circuit (VHSIC) Hardware Description Language (HDL) or VHDL in reconfigurable hardware fabrics such as Field Programmable Gate Arrays (FPGA). FPGAs may be used as an alternative to custom application specific integrated circuit (ASIC) or even a more generic microprocessor. In this manner, the reconfigurable processor 106 may synthesize alternate hardware configurations or expressions without changing the physical hardware. The computing device 102 may also be a server(s) 108 and may operate together with other computing devices 102 to collect execution statistics and/or to communicate data related thereto to a server. The server 108 and computing devices 102 may reside physically next to or be remotely located.

With continuing reference to FIG. 1, the components, including the computing devices 102 and the servers 108, of the system 100 may each include hardware, software, firmware, or combinations thereof. For example, software residing in memory of one of the computing devices 102 may include instructions executed by a microprocessor for implementing functions disclosed herein. As an example, the system 100 may include the computing device 102, and reconfigurable processor 106. The computing device 102 may also include an electronic display 110 (e.g., a touchscreen display, computer monitor, and the like). The computing device 102 may also include memory 112, a microprocessor 114, and a battery 116. The microprocessor 114 may or may not be the same as the reconfigurable processor 106. The computing device 102 may also include a communications network interface 118 for communicating with the network 104. The computing device 102 may also be a tablet computer 119 or a smartphone 120.

With continued reference to FIG. 1, the computing device 102 in the system 100 may include the reconfigurable processor 106 for executing a set of CPU instructions, each CPU instruction of the set of CPU instructions having a function such as, for example, branching, jumps or returns. As disclosed herein, the set of CPU instructions may be executed during the testing phase as unmodified or substantially unmodified and substantially similar to the "shipping image" which is the software image shipped as an end product. The testing phase may include testing the set of CPU instructions without the need for using trace ports which may require additional external hardware. As disclosed herein, while the set of CPU instructions may remain unmodified during the software testing phase, the function or operation underlying the specific CPU instruction may, in fact, be modified, such that the software image executed is substantially similar or identical to shipping image, but allowing for identification or storing of execution nodes and paths may still be possible. In this manner, the function of at least one CPU instruction of the set of CPU instructions for the reconfigurable processor 106 may be modified to identify, store and/or report an instruction address and a destination address of the at least one CPU instruction when executed. By identifying the instruction address and the destination address of the CPU instruction when executed, the computing device 102 can collect execution statistics for later analysis. The analysis may include determining whether a CPU instruction was executed at least once or the number of times the CPU instruction was executed, thereby enabling an ability to profile the software image. As an example, profiling the software image may include determining functions, aspects or characteristics of a targeted ASIC which may be underutilized by the set of CPU instructions in the software image and therefor may be eliminated from the ASIC altogether. For example, if via profiling, it is determined that an arithmetic logic unit (ALU) is not utilized, the ASIC may be able to be designed without an ALU thereby enabling a reduction of size of the ASIC or shifting the use of the ALU space on the ASIC to other resources, such as, additional memory. As an additional example, by determining whether the reconfigurable processor 106 executes a CPU instruction in the software image including the set of CPU instructions, a code coverage percentage, as described herein, may be determined. For example, a code coverage percentage of the set of CPU instructions may be maximized to confirm as much of the set of CPU instructions has been tested as possible.

With continued reference to FIG. 1, execution of a set of CPU instructions may include fetching a CPU instruction based on the set of CPU instructions. Fetching may be implemented by the reconfigurable processor 106. The reconfigurable processor 106 may subsequently decode the fetched CPU instruction and execute the decoded CPU instruction. The reconfigurable processor 106 may determine whether the executed instruction address and destination address pair of one or more of the modified CPU instruction has been executed. In response to determining that the pair has been executed, an executed bit associated with the executed instruction address and destination address pair may be incremented. The reconfigurable processor 106 may store the identified instruction address and destination address pair as an executed instruction address and destination address pair. Further, the reconfigurable processor 106 may store the identified instruction address and destination address individual or as a pair in memory in the reconfigurable processor 106 or in any suitable storage or memory medium.

With continued reference to FIG. 1, the computing device 102 including the reconfigurable processor 106 may be configured to display the code coverage as a result of the testing of the set of CPU instructions in a user interface on the electronic display 110. The displaying of the code coverage may be as a numeric value, as a graph, as an image or as any other means to communicate the code coverage of the set of CPU instructions including individual CPU instructions in the set of CPU instructions. The reconfigurable processor 106 may increment a counter associated with the identified instruction address and destination address pair indicating the number of times the instruction address and destination address pair has been executed. In this manner, the reconfigurable processor 106 may be configured to determine an execution profile of the set of CPU instructions. The execution profile may include determining the portions of the ASIC or microprocessor (e.g., ALU and the like) that may be over or underutilized.

Figure 2:
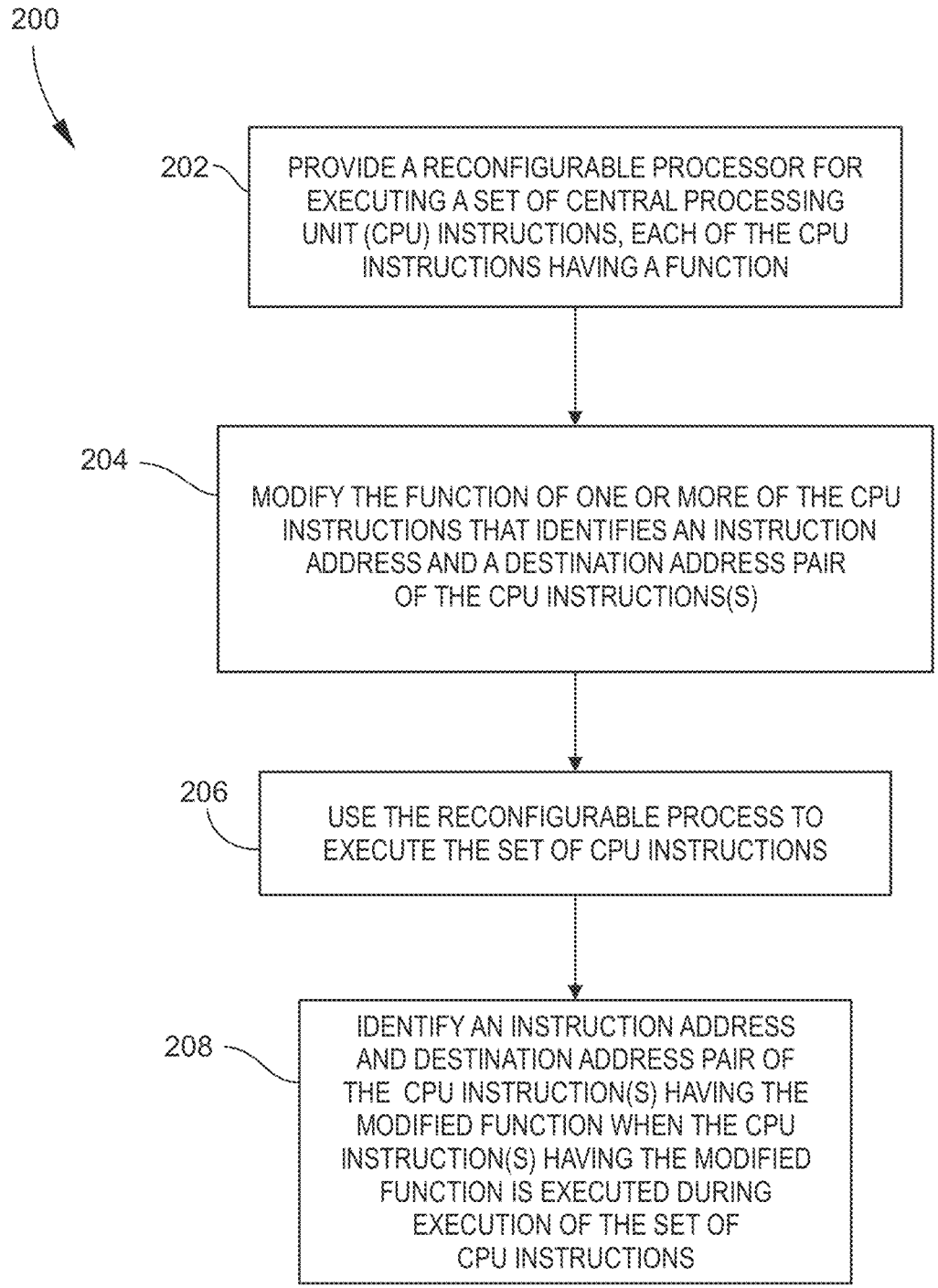
FIG. 2 is a flowchart of an example method for collecting computer program instruction execution statistics using a reconfigurable processor according to embodiments of the present disclosure.

FIG. 2 illustrates a flowchart of an example method 200 for collecting computer program instruction execution statistics using a reconfigurable processor according to embodiments of the present disclosure. In this example, the method 200 is described as being implemented by the system 100 shown in FIG. 1, although it should be understood that the method may alternatively be implemented by any other suitable system or computing device.

Referring to FIG. 2, the method includes providing 202 a reconfigurable processor configured to execute a set of CPU instructions that each have a function. For example, the reconfigurable processor 106 may execute a set of CPU instructions that each have a function.

The method 200 of FIG. 2 includes modifying 204 the function of one or more of the CPU instructions that identifies an instruction address and a destination address pair of the CPU instruction(s) based on a defined test case. Continuing the aforementioned example, the reconfigurable processor 106 may modify the function of one or more of the CPU instructions that identifies an instruction address and a destination address pair of the CPU instruction(s), such that modifying the function of at least one of the CPU instructions may be based on a defined test case. As an example, a defined test case may include a set of conditions or variables under which a tester may determine whether an application, software system or one of the included features in the set of CPU instructions is performing as originally intended to function.

The method 200 of FIG. 2 includes using 206 the reconfigurable processor to execute the set of CPU instructions. Continuing the aforementioned example, the reconfigurable processor 106 may execute the set of CPU instructions.

The method 200 of FIG. 2 includes identifying 208 an instruction address and destination address pair of the CPU instruction(s) having the modified function when the CPU instruction(s) having the modified function is executed during execution of the set of CPU instructions. Continuing the aforementioned example, the reconfigurable processor 106 may identify an instruction address and destination address pair of the CPU instruction(s) having the modified function when the CPU instruction(s) having the modified function is executed during execution of the set of CPU instructions. As an example, following the execution of the defined test cases the identified instruction address and destination address pairs of the CPU instruction(s) may be stored in on-chip static random access memory (SRAM). The identified instruction address and destination address pairs of the CPU instructions(s) may then be collected for analysis from the on-chip SRAM. The on-chip SRAM may subsequently be cleared for the next test case execution. As an example, using external software (e.g. compiler tools), the collected information may then be used to determine effective code coverage as a scalar value (e.g. percentage of CPU instructions executed out of the set of CPU instructions) as well as identify areas of the set of CPU instructions not being executed. In this manner, using the collected information, iterative test case development may result in higher test efficiency and increased code coverage.

Figure 3:
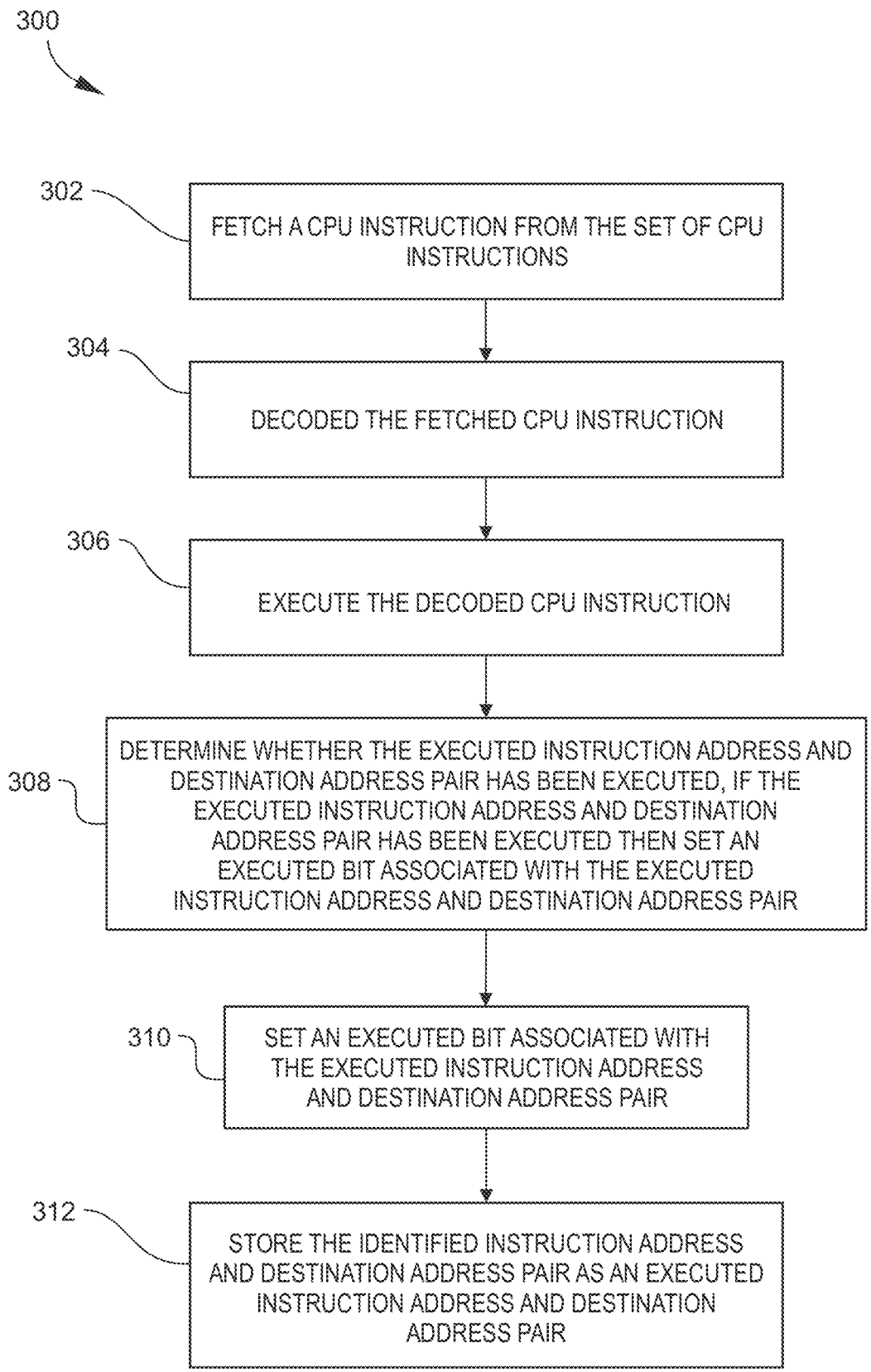
FIG. 3 is a flowchart of another example method for the collecting computer program instruction execution statistics using reconfigurable processors according to embodiments of the present disclosure.

FIG. 3 illustrates a flowchart of another example method 300 for the collecting computer program instruction execution statistics using reconfigurable processors according to embodiments of the present disclosure. The method 300 can be implemented by the system 100 shown in FIG. 1, although it should be understood that the method may alternatively be implemented by any other suitable system or computing device.

Referring to FIG. 3, the method 300 includes fetching 302 a CPU instruction from a set of CPU instructions. The method 300 also includes decoding 304 the fetched CPU instruction. Additionally, the method 300 includes executing 306 the decoded CPU instruction. The method 300 may also include determining 308 whether the executed instruction address and destination address pair has been executed. Further, the method 300 includes setting 310 an executed bit associated with the executed instruction address and destination address pair in response to determining that the executed instruction address and destination address pair has been executed. Additionally, the method 300 includes storing 312 the identified instruction address and destination address pair as an executed instruction address and destination address pair. It is noted that modification of the CPU instruction may include modifying the function to record other characteristics of the CPU instruction that may be desired during the testing phase of the set of CPU instructions.

Figure 4:
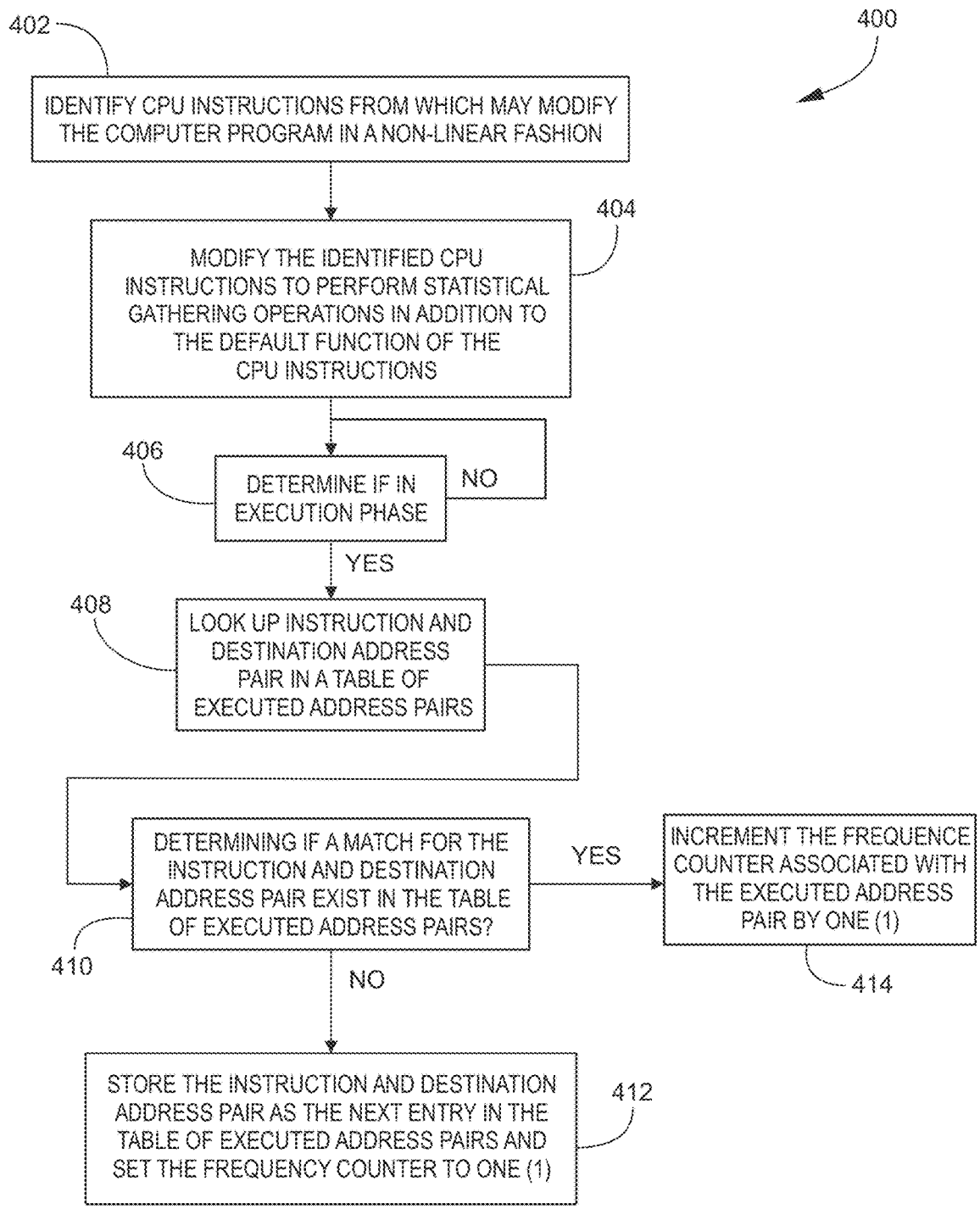
FIG. 4 is a flow chart of another example method for collecting execution statistics using reconfigurable processors according to embodiments of the present disclosure.

FIG. 4 illustrates a flowchart of another example method 400 for collecting execution statistics using reconfigurable processors according to embodiments of the present disclosure. In this example, the method 400 is described as being implemented by the system 100 shown in FIG. 1, although it should be understood that the method may alternatively be implemented by any other suitable system or computing device.

Referring to FIG. 4, the method includes identifying 402 CPU instructions which may modify the operation of the computer program in a non-linear fashion. For example, CPU instructions which may modify the computer program in a non-linear fashion may include instructions that cause a branch, jump, or return, as non-limiting examples.

The method 400 of FIG. 4 includes modifying 404 the identified CPU instructions to perform statistical gathering operations in addition to the default function of the CPU instruction. Continuing the aforementioned example, the identified CPU instructions may be modified to gather or collect statistics related to the number of times a branch or node is executed, in addition to the default branching function associated with the branch CPU instruction.

The method 400 of FIG. 4 includes determining 406 if the program is in an execution phase. Continuing the aforementioned example, following the identification 402 and the modification 404 steps described above, the program may be executed in a run-time environment wherein the program may be executed to gather execution statistics. If a determination is made that the program is not executing in a run-time environment, the method 400 may not proceed forward.

The method 400 of FIG. 4 includes looking up 408 the instruction and destination address pair in a table of executed address pairs. Continuing the aforementioned example, the table of executed address pairs, described in FIG. 5, may include node labels, the instruction address, the destination address and the associated statistical information, such as, the number of times the address pair has been executed.

The method 400 of FIG. 4 includes determining 410 if a match for the instruction and destination address pair exist in the table of executed address pairs. Continuing the aforementioned example, a determination that the instruction and destination address pair exist in the table of executed address pairs is an indication that the instruction and destination address pair have been executed and may not need to be re-entered in the table of executed pairs.

The method 400 of FIG. 4 may include, if a determination 410 is made that the instruction and destination address pair did not have a match in the table of executed pairs, storing 412 the instruction and destination address pair as the next entry in the table of executed address pairs and set the frequency counter to one (1). Continuing the aforementioned example, entering the instruction and destination address pair in the table of executed address pairs and setting the frequency counter to one (1) may indicate the first execution of the instruction and destination address pair.

The method 400 of FIG. 4 may include, if a determination 410 is made that the instruction and destination address pair did have a match in the table of executed pairs, incrementing 414 the current value of the frequency counter associated with the executed address pair by one (1). Continuing with the aforementioned example, incrementing the frequency counter may indicate the instruction and destination address pair have been executed previously and the value of the frequency counter will continue to be incremented such that the table of executed pairs indicates the total number of times the instruction and destination address pair have been executed.

Figure 5:
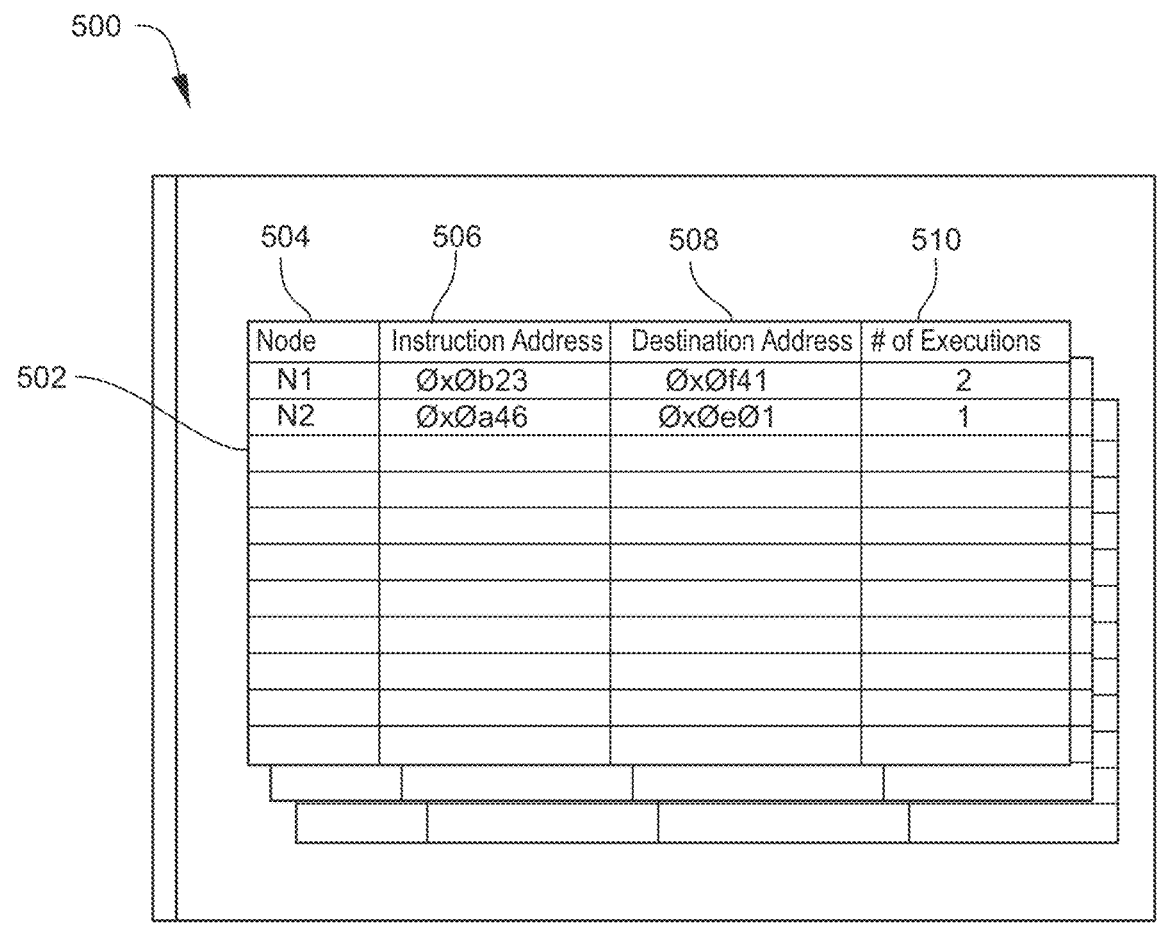
FIG. 5 is a diagram of example execution statistics collected using the reconfigurable processor according to embodiments of the present disclosure.

FIG. 5 illustrates a diagram 500 of example execution statistics collected using the reconfigurable processor according to embodiments of the present disclosure. For example, the statistics may be collected using the reconfigurable processor 106 shown in FIG. 1 or any other suitable processor. Referring to FIG. 5, the diagram 500 shows an example table of stored data 502. The table of stored data 502 may include a plurality of tables 502 representing various portions of the set of CPU instructions executed by the reconfigurable processor 106. The table of stored data 502 may include a node label 504 identifying a node or CPU instruction, an instruction address 506 representing the address of execution for the CPU instruction and a destination address 508 representing the next node of execution. Using the instruction address 506 and the destination address 508, an instruction segment or path may be identified. The instruction segment or path may be used to define the code coverage. Additionally, an execution count 510 indicating the number of times an instruction segment or path has been executed may also be stored. It is noted that it may be desired that other characteristics of CPU instruction be stored in the table of store data 502.

Figure 6:
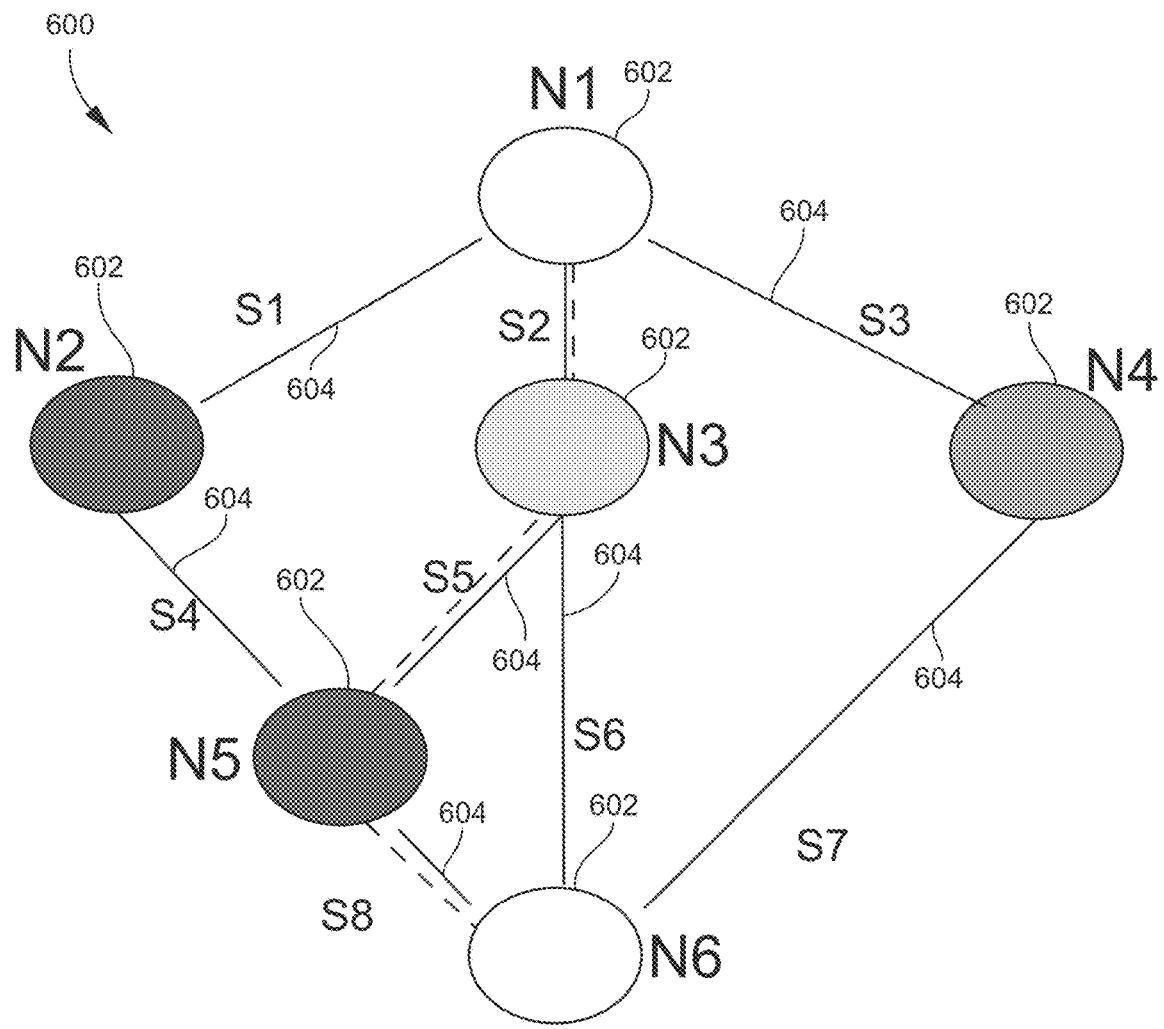
FIG. 6 is a diagram showing an example node map for depicting code coverage according to embodiments of the present disclosure.

FIG. 6 illustrates a diagram showing an example node map 600 for depicting code coverage according to embodiments of the present disclosure. Referring to FIG. 6, the node map 600 shows a set of CPU instructions. Node Nx (e.g., N1, N2, etc.) indicates a CPU instruction node 602. Node Sx (e.g., S1, S2, etc.) indicates a CPU code segment 604 defined by the instruction address and the destination address of the CPU instruction. As an example, if it is determined that CPU instruction nodes N1, N3, N5 and N6 corresponding to CPU code segments S2, S5 and S8 have been executed, then it may also be said that one (1) complete path between the node N1 and the node N6 out of four (4) possible paths between the node N1 and the node N6 has been executed. In this example, code coverage may be determined to be twenty-five (25%) percent.

Figure 7:
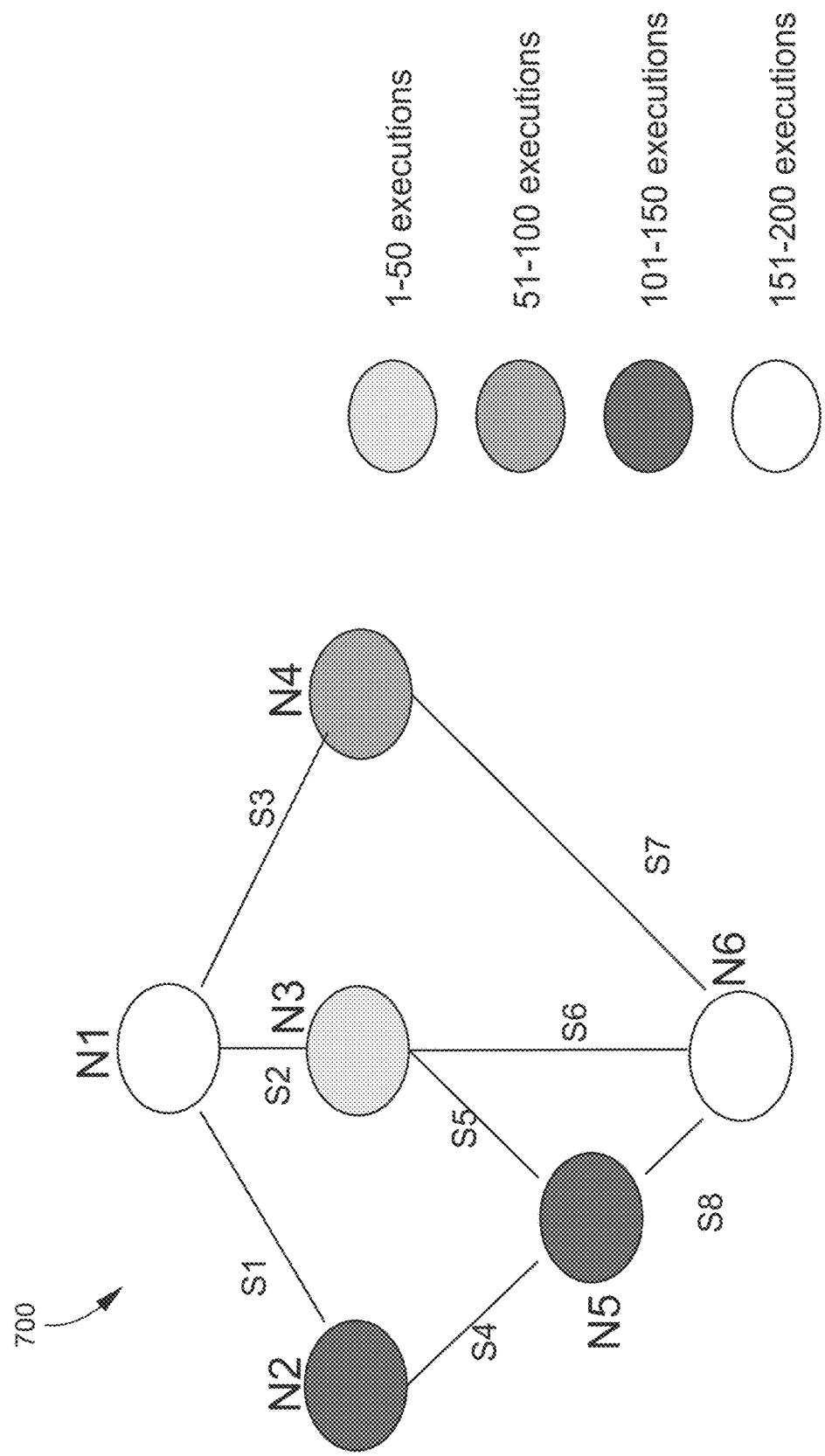
FIG. 7 is a diagram showing an example node map depicting code coverage along with an execution count that may be used in profiling a set of CPU instructions according to embodiments of the present disclosure.

FIG. 7 illustrates a diagram showing an example node map 700 depicting code coverage along with an execution count that may be used in profiling a set of CPU instructions according to embodiments of the present disclosure. In a continuation of the example of FIG. 6, an execution count may also be included, along with a legend using colors, symbols, numbers, or the like for indicating a range for the execution count of each segment or node. As an example, the execution count data captured may be used to profile portions of the set of CPU instructions or the execution count may also be used to indicate sufficient code coverage. The execution count may also be displayed as described herein using colors, symbols, or the like for indicating execution count ranges.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a reconfigurable processor that executes at least one CPU instruction of a set of central processing unit (CPU) instructions;
modifying, using the reconfigurable processor and a memory, a function of the at least one CPU instruction of the set of CPU instructions;
identifying an executed instruction address and a destination address pair within the reconfigurable processor of the at least one CPU instruction of the set of CPU instructions based on a defined test case;
modifying the function of the at least one CPU instruction to record the CPU instruction during execution of the defined test case;
executing, using the reconfigurable processor, the set of CPU instructions;
identifying, using the at least one processor and the memory, the executed instruction address and the destination address pair within the reconfigurable processor of the at least one CPU instruction of the set of CPU instructions having the modified function when the at least one CPU instruction of the set of CPU instructions having the modified function is executed during the execution of the set of CPU instructions;

determining an instruction path based on the identified executed instruction address and the identified destination address pair;

determining at least one CPU instruction segment based on the instruction address and destination address pair;

identifying at least one CPU instruction node within the set of CPU instructions;

determining whether the at least one CPU instruction segment and CPU instruction node have been executed;

in response to determining that the at least one CPU instruction segment and CPU instruction node have been executed, storing an execution count indicating a number of times each of the at least one CPU instruction segment and CPU instruction node has been executed;

determining whether the executed instruction address and the destination address pair within the reconfigurable processor of the at least one CPU instruction of the set of CPU instructions having the modified function that has not been executed;

in response to determining that the executed instruction address and the destination address pair having the modified function that has not been executed, storing the instruction path, and the instruction address and the destination address pair as a next entry for execution;

fetching the CPU instruction based on the set of CPU instructions having the modified function;

decoding the fetched CPU instruction having the modified function; and executing the decoded CPU instruction having the modified function.

2. The method of claim 1, wherein the instruction address represents an address of execution for the CPU instruction of the set of CPU instructions; and wherein the destination address represents an address of a next node of execution within the set of CPU instructions.

3. The method of claim 1, further comprising:

determining whether the executed instruction address and the destination address pair has been executed;

in response to determining that the executed instruction address and destination address pair has been executed, setting an executed bit associated with the executed instruction address and the destination address pair; and determining one or more portions of the reconfigurable processor that is one of overutilized or underutilized by the set of CPU instructions based on the identified executed instruction address and the destination address pair.

4. The method of claim 3, further comprising storing the executed instruction address and the destination address pair.

5. The method of claim 4, wherein the instruction path comprises a code coverage of the set of CPU instructions.

6. The method of claim 5, further comprising using a user interface to display the code coverage of the set of CPU instructions.

7. The method of claim 4, further comprising incrementing a counter associated with the executed instruction address and the destination address pair that indicates the number of times the executed instruction address and the destination address pair has been executed.

8. The method of claim 7, further comprising determining an execution profile of the set of CPU instructions.

9. The method of claim 8, further comprising using a user interface to display the execution profile of the set of CPU instructions.

10. The method of claim 4, wherein storing the identified instruction address and the destination address pair comprises storing the identified instruction address and destination address pair in an on-chip static random access memory.

11. A system comprising:

a reconfigurable processor comprising at least one processor and memory that:

executes a set of central processing unit (CPU) instructions;

modifies a function of at least one of the CPU instructions of the set of CPU instructions that identifies an executed instruction address and a destination address pair of the at least one of the CPU instructions of the set of CPU instructions based on a defined test case;

modifies the function of the at least one CPU instruction to record the CPU instruction during execution of the defined test case;

executes the set of CPU instructions;

identifies the executed instruction address and the destination address pair of the at least one of the CPU instructions of the set of CPU instructions having the modified function when the at least one of the CPU instructions of the set of CPU instructions having the modified function is executed during an execution of the set of CPU instructions;

determines an instruction path based on the identified executed instruction address and the identified destination address pair;

determining at least one CPU instruction segment based on the instruction address and destination address pair;

identifying at least one CPU instruction node within the set of CPU instructions;

determining whether the at least one CPU instruction segment and CPU instruction node have been executed;

in response to determining that the at least one CPU instruction segment and CPU instruction node have been executed, storing an execution count indicating a number of times each of the at least one CPU instruction segment and CPU instruction node has been executed;

determines whether the executed instruction address and destination address within the reconfigurable processor of the at least one CPU instruction of the set of CPU instructions having the modified function that has not been executed;

in response to determining that the executed instruction address and the destination address pair having the modified function has not been executed, storing the instruction path, and the instruction address and the destination address pair as a next entry for execution;

fetches CPU instruction based on the set of CPU instructions having the modified function;

decodes the fetched CPU instruction having the modified function; and executes the decoded CPU instruction having the modified function.

12. The system of claim 11, wherein the instruction address represents an address of execution for the CPU instruction of the set of CPU instructions; and wherein the destination address represents an address of a next node of execution within the set of CPU instructions.

13. The system of claim 11, wherein the reconfigurable processor:
   determines whether the executed instruction address and destination address pair has been executed; and
   sets an executed bit associated with the executed instruction address and destination address pair in response to determining that the executed instruction address and destination address pair has been executed; and
   determines one or more portions of the reconfigurable processor that is one of overutilized or underutilized by the set of CPU instructions based on the identified executed instruction address and destination address pair.

14. The system of claim 13, wherein the reconfigurable processor stores the executed instruction address and destination address pair.

15. The system of claim 14, wherein the instruction path comprises a code coverage of the set of CPU instructions.

16. The system of claim 15, further comprising a user interface, and
   wherein the reconfigurable processor is configured to controls the user interface to display the code coverage of the set of CPU instructions.

17. The system of claim 14, wherein the reconfigurable processor increments a counter associated with the executed instruction address and the destination address pair that indicates the number of times the executed instruction address and the destination address pair has been executed.

18. The system of claim 17, wherein the reconfigurable processor determines an execution profile of the set of CPU instructions.

19. The system of claim 18, further comprising a user interface, and
   wherein the reconfigurable processor controls the user interface to display the execution profile of the set of CPU instructions.

20. The system of claim 14, wherein the reconfigurable processor stores the identified instruction address and destination address pair comprises storing the identified instruction address and destination address pair in an on-chip static random access memory.

* * * * *